United States Patent [19]

Behdorf et al.

[11] Patent Number: 4,996,095
[45] Date of Patent: Feb. 26, 1991

[54] COMPOSITE MATERIAL OF ALUMINUM AND GLASS FIBER MAT, METHOD FOR ITS PRODUCTION, AND METHOD FOR UTILIZATION AS INSULATOR FOR VEHICLES

[75] Inventors: Hans Behdorf, Alfter; Thomas Singe, Swisttal; Gerhardt Söllner, St. Augustin, all of Fed. Rep. of Germany

[73] Assignee: Vereinigte Aluminum Werke A.G., Fed. Rep. of Germany

[21] Appl. No.: 214,681

[22] Filed: Jul. 1, 1988

[30] Foreign Application Priority Data

Jul. 1, 1987 [DE] Fed. Rep. of Germany ....... 3721715
Jul. 1, 1987 [DE] Fed. Rep. of Germany ....... 3721717

[51] Int. Cl.⁵ .................. B32B 7/02; B32B 15/08

[52] U.S. Cl. .................. 428/215; 428/219; 428/289; 428/432; 428/457; 428/461

[58] Field of Search ............... 428/457, 31, 34.5, 289, 428/215, 219, 461, 432; 156/62.2

[56] References Cited

U.S. PATENT DOCUMENTS

| | | | |
|---|---|---|---|
| 2,592,684 | 4/1952 | Grimshaw | 428/31 X |
| 2,611,687 | 9/1952 | Logue | 428/31 |
| 4,053,447 | 10/1977 | Shea | 428/289 X |
| 4,076,873 | 2/1978 | Shea | 428/34.5 |
| 4,514,003 | 4/1985 | Guy | 428/31 X |
| 4,522,875 | 6/1985 | Still, Jr. et al. | 428/285 |

Primary Examiner—Thomas J. Herbert
Attorney, Agent, or Firm—Darby & Darby

[57] ABSTRACT

A layered composite material of aluminum and glass fibers for use as an insulator and a clamping device for use in conjunction with such composites.

13 Claims, 2 Drawing Sheets

COMPOSITE MATERIAL OF ALUMINUM AND GLASS FIBER MAT, METHOD FOR ITS PRODUCTION, AND METHOD FOR UTILIZATION AS INSULATOR FOR VEHICLES

TECHNICAL FIELD

The present invention relates to a layered composite material of aluminum and glass fibers for use as an insulator and to a clamping device for use in conjunction with such composites.

BACKGROUND OF THE INVENTION

A panel comprising a glass fiber mat bearing an aluminum foil sheet on one side is known for use for heat insulation in the construction and automotive fields. The aluminum foil sheet of this panel serves as a vapor barrier. These panels are used on the exterior of motor vehicles to shield the vehicle floor from the heat that is released by the exhaust system piping. A drawback to this construction is that the glass fiber mat layer is subject to absorption of moisture through its uncoated side, especially when utilized on the underside of a motor vehicle. Additionally, such a panel lacks structural strength and therefore cannot be used as a support, and is also difficult to handle.

In the motor vehicle field, certain characteristics are desirable for an insulating panel. The panel must be shapeable (deformable) so that it can be adapted to the often complex contours of the vehicle parts which are to be insulated. It is often necessary to achieve the lowest possible thermal conductivity and to thermally isolate the insulated structures from adjacent structures. Sound insulation of certain structures is necessary with respect to sound emissions and noise pollution. Due to the stringent requirements of extended product life, high resistance to corrosion is required today, particularly where the product that is subject to corrosion comes into direct contact with moisture and with corrosion-promoting substances (brake dust, road salt, etc.). Finally, during conventional procedures for the bonding of aluminum and a glass fiber mat (which procedures use solvent-containing adhesives), a considerable amount of solvent emission may occur. This is not desirable from the environmental standpoint. Also, it is required that during operation at high temperatures, the quantity of emissions resulting from the decomposition products of heat insulation materials or bonding aids be kept as low as possible.

The Manual "Kunststoffverarbeitung" (Plastic Processing), Vogel-Verlag 1981, page 194, discloses various adhesives for the production of aluminum laminates. Suitable adhesives for glass fiber mat are disclosed on page 142 of this text.

Numerous clamping and gripping devices are known in the art for use in various applications. In the text "Aluminum Taschenbuch" (Aluminum Manual), 14th edition, pp. 827 ff, clamping devices for use with vehicle sheathing, both with and without the use of extruded sections, are disclosed. The devices consist of several separate parts and normally contain a stud or a clamping screw for bracing the fastening elements. It is clearly desirable to minimize the number of clamping devices required to fasten a panel, such as a vehicle sheathing or insulation panel.

For composite panels made with elastic core materials, the known clamping devices designed for use with non-flexible core materials cannot be used. This is especially true for sandwich construction with thin outer layers where a large surface area, for contact between the fastening clamp and the composite panel, is desirable. This large surface area is required to significantly reduce fraying, shattering or tearing of the composite panel in the area of fastening. One problem is that many clamping devices are suitable only for use with panels of a particular thickness, and cannot be easily adapted for use to fasten panels having different thicknesses.

SUMMARY OF THE INVENTION

The present invention is a composite material comprising
an aluminum foil sheet having a thickness between 0.05 and 0.25 mm,
a fiber glass mat having a thickness of between 3 and 10 mm joined to one side of said foil by a bonding agent, and
an aluminum sheet having a thickness of between 0.4 and 0.8 mm joined to the other side of said glass mat by said bonding agent,
said bonding agent comprising a heat sealing lacquer comprising a polyethylene ionomer resin layer having a weight of between 3 and 13 grams per square meter.

The invention includes a device for fastening the insulating panels to vehicles and other surfaces. The fastening device comprises a combination of a resilient spring clip and fastening clamp, said clamp having a plurality of spaced apart self-cutting ribs connected to said clip by bending said ribs into contact with said clip.

DETAILED DESCRIPTION OF THE INVENTION

Figure 1:
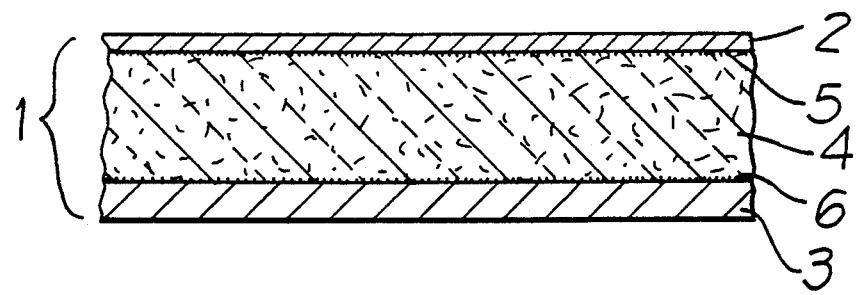
FIG. 1 shows a cross section of a composite panel according to the present invention.

The composite panel of the present invention (which can serve as an insulating panel and a moisture barrier) comprises a fiberglass mat sandwiched between two sheets or foils of aluminum. The composite is joined together with a polyethylene ionomer resin layer having a weight of 3 to 13 grams per square meter.

The bilateral moisture barrier of the present invention is a composite heat shielding panel and serves at the same time to reflect heat away from the vehicle floor and as a supporting structural member. Apart from ease of handling during manufacture, transportation and installation, a bilateral moisture barrier is necessary to avoid reducing the insulating effect of the panel due to moisture absorption by the insulating material resulting from the high moisture load in the vehicle floor region.

The edge region of the composite material is secured against the invasion of moisture by mechanical union, e.g. flanging, thereby protecting against corrosion.

The use of a thermoplastic ionomer resin as the bonding agent to join the members of the composite panel is desirable because such a resin has high film and high adhesion capacities as well as good hot tack properties. This makes it possible to embed a fibrous mat into the thermoplastic polymer layer at the lowest possible layer thickness during the process of sealing (or joining) the composite panel elements together. As employed herein, the term "hot tack" refers to the adhesive strength of the melted seal layer during the sealing process. A polyethylene-ionomer resin with a layer weight of 3 to 13 g/m$^2$ is preferably utilized as the bonding material in the present invention. The ionomer resins used in the invention preferably comprise inorganic salt groups attached to a polyethylene polymer chain. Examples of suitable inorganic salt groups are sodium salts, zinc salts, potassium salts and lithium salts. The preferred thermoplastic polymer is polyethylene. The preferred polyethylene ionomer resin is a pure Surlyn dispersion (available from AKZO Chemie). The preferred lacquer material is available from Vereinigte Aluminum-Werke A.G., located in Grevenbroich, W. Germany as product number 200 F 00.

The glass fiber mat used as the insulating material comprises glass fibers with a thickness of 8 to 11 microns. These fibers are built up into a mat with a thickness of 3 to 10 mm and a crude density of 90 to 180 kg/m$^3$. The term "glass fiber mat" includes woven and non-woven glass fiber mats including mats made with cross filaments, glass needle mats (e.g., those available from Manville International Corporation, U.S.A.) and glass fiber fabric mats. The mat is initially untreated and bonding agent-free.

The composite material of the present invention combines an asymmetrical metal coating comprising a relatively thick aluminum sheet layer and a relatively thin aluminum foil layer with an interposed glass fiber mat of a predetermined density, thickness and resilience. The thickness ratio of the aluminum layers to the glass fiber mat is substantially 1 : 30 3.5 (aluminum foil sheet to glass mat to aluminum sheet). The aluminum foil layer may have a thickness of 0.05 to 0.25 mm, preferably 0.15 mm, while the relatively thicker aluminum sheet may be 0.4 to 0.8 mm and is preferably 0.5 mm thick. The aluminum foil preferably consists of pure aluminum in the cold rolled state. The aluminum sheet preferably consists of pure aluminum which has been cold rolled and annealed.

To manufacture the panel product, coils or rolls of aluminum sheet and foil are respectively coated on one side (which will contact the glass fiber mat) with the heat sealing adhesive lacquer by a coil coating procedure. The composite material of the present invention is preferably manufactured continuously, using the assembly line method, by bringing together the aluminum sheet, the glass fiber mat and the aluminum foil sheet. The hot sealing lacquer is then activated within seconds at sealing temperatures of more than 140° C. under light pressure of 2 to 10 bar. The sealing temperature is preferably in the range of 140° to 170° C. The sealing process takes approximately 1 to 20 seconds, i.e., the lacquer will cure to dryness in about 1 to 20 seconds.

The heat-sealing lacquer application consists of a dried aqueous dispersion wherein the dispersion consists of an ammoniacally saponified secondary dispersion prepared with the use of anionic emulsifiers. The dispersion is stabilized by the ammoniacal saponification treatments. The aqueous dispersion contains 35% dispersoid and 65% water. The preferred drying temperature is 150° C.

The finished dispersion preferably has a solids content of 20 to 50%, a viscosity of 100 to 1000 milli Pascal seconds (mPa s) at a pH of 9.8 to 10.5, and a particle size of 1 to 4 microns.

Hollow chambers are embossed (e.g., corrugated) into the aluminum foil, which enhances the shapeability of the resulting composite material, allowing it to be elongated without cross-sectional alteration, under physical deformation or even under stretching. The corrugation cavities or chambers have a cross section of a few mm$^2$, preferably 2 to 4 mm square, and are spaced apart at a distance of 1 to 2 mm between cavities.

The composite panel of the present invention may be shaped to the contours of the vehicle to which it is to be affixed. During the shaping process used to adapt the composite material to the contours of the vehicle, the glass fiber mat is compacted to 30 to 40% of its original thickness. In this compacted state, the shaping forces required to conform the composite panel to the vehicle contours are transmittable, so that the following processes may be employed to shape the composite panel: deep drawing, combined deep drawing-stretch forming, bending, and crimping.

After completion of the shaping process, the glass fiber mat is allowed to expand and the aluminum layers are brought to the original distance from each other again by the resilience of the glass fiber mat. Thereby the insulating effect of the glass fiber mat layer is restored after the shaping process since the thermal conductivity of the glass fiber mat layer is not decreased.

The composite panel insulates the interior of the vehicle from transmission of both heat and sound (developed by the engine exhaust system and the catalytic converter) through the floor boards of the vehicle. An additional advantage of the panel construction system of the present invention is the very low level of pollutants emitted, as no solvents are released either during the manufacture of the panel nor during utilization of the panel under the exterior of a vehicle, i.e., no solvents are required to make the adhesive material used to join the composite. The present invention meets the requirements of a composite panel in an optimum manner and, in particular, makes available an aluminum composite material for insulation against heat at temperatures ranging up to 500° C.

The composite panel 1 of the present invention is illustrated in FIG. 1. The aluminum foil layer 2 and the aluminum sheet 3 enclose the glass fiber mat 4. Between each sheet 2 and 3 and the glass fiber mat 4, the corresponding layers 5 and 6 of the adhesive lacquer are applied for bonding purposes.

Figure 2:
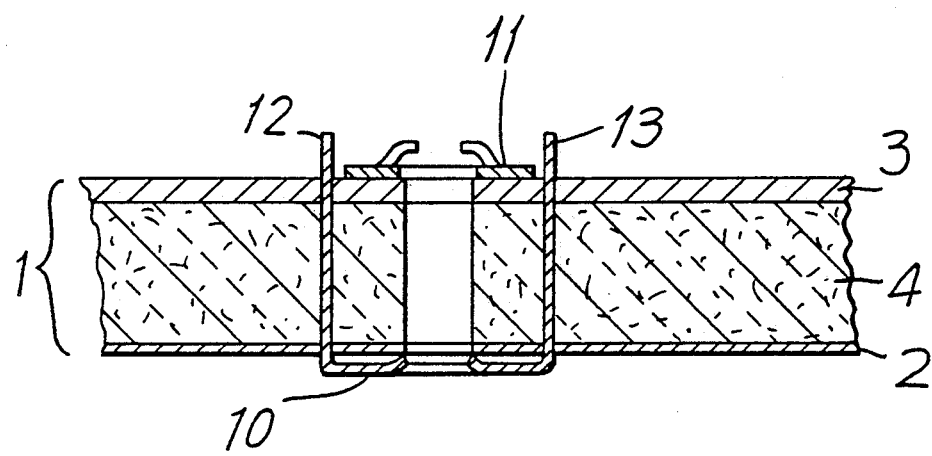
FIG. 2 shows a transverse section through a composite panel with the fastening system of the present invention before clamping.

The fastening device of the present invention comprises a fastening clamp and a spring clip. FIG. 2 illustrates the composite panel 1, the fastening clamp 10, and the spring clip 11. Clip members 20 are made of a resilient material (e.g., spring steel). The ribs 12 and 13 of the fastening clamp 10 are longer than the structural height of the composite panel 1 and thus clearly protrude from the panel.

Figure 3:
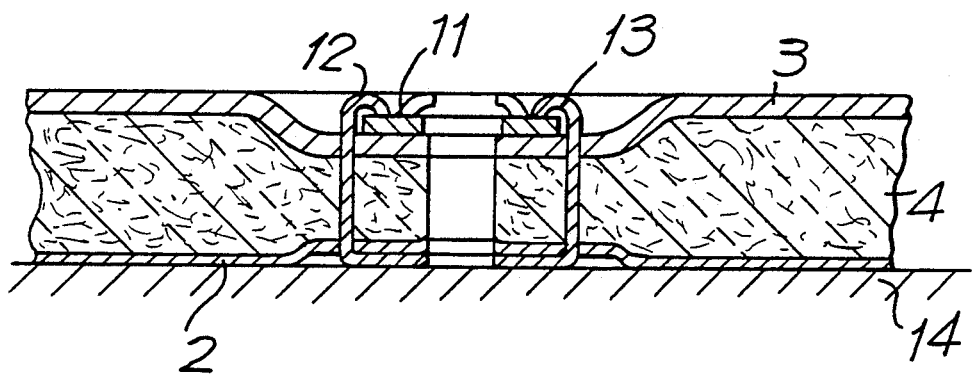
FIG. 3 shows a transverse section through a composite panel with the fastening system of the present invention after clamping.

While the flexible core is suitably compressed, the ribs 12 and 13 are bent over toward the spring clip 11, so that there results a firm union as shown in FIG. 3. Differences in the structural height of the composite panels are compensated for by the fastener fittings, in that at the time the fastener fittings are installed, the height of the attachment point is determined by a holddown and the ribs 12 and 13 are laid over more or less accordingly.

The composite panel may be fastened under the exterior of a vehicle to function as an insulator. The special design of the fastening clamp 10 according to the invention, as shown in FIG. 2, eliminates the need for preassembly, as the ribs 12, 13 and 15 of the fastening clamp 10 are self-cutting; that is, the ribs are designed to cut through an unperforated sandwich panel 1. The fastening clamp 10 and spring clip 11 are designed to increase the contact area between the panel and the fastening device. This increased surface area spreads the force exerted on the panel when the panel is attached to a surface via the fastening device, thereby reducing the tendency of the panel to fray, shatter or tear in the area of the fastening device.

As the structural heights of the composite panels 1 may be different, the ribs 12, 13 and 15 are flexible and can be bent over more or less according to the structural height or thickness of the composite panel 1.

During the clamping process, the fastening clamp 10 according to the present invention deforms the flexible core of the sandwich so that it forms a plane with the composite panel 1. In FIG. 3, the flexible core 4 of the composite panel 1 is compressed, so that a flat bearing surface results between the base 14 (e.g. vehicle floor), the fastening clamp 10, and the bottom sheet 2 of the composite panel 1. This can be achieved in the same manner with the top sheet 3 and the laid-over ribs 12 and 13. Further, by different heights of deformation, depending on the constitution of the flexible core, the stiffness needed for the fastening can be obtained in the attachment region.

Figure 4A:
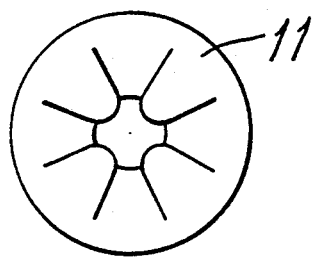
FIG. 4a shows the spring clip of the present invention in top view.
Figure 4B:
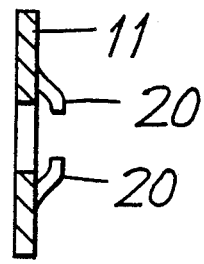
FIG. 4b shows the spring clip of the present invention in side view.

FIGS. 4a and b illustrate a spring clip 11 in top and side views. These parts are commercially available; the fastening system according to the present invention must be adapted to the outer contour of the spring clip.

Figure 5A:
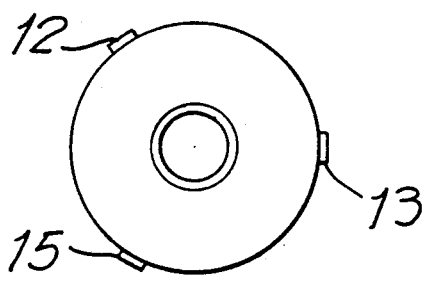
FIG. 5a shows the fastening clamp of the present invention in top view.
Figure 5B:
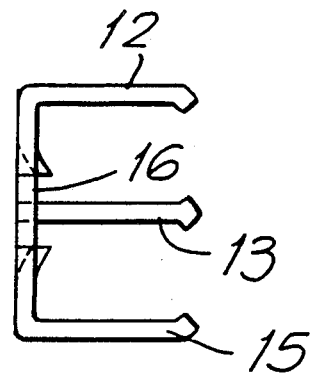
FIG. 5b is a side view of the fastening clip of the present invention.

FIGS. 5a and b illustrate the fastening clamp 10 according to the present invention in top and side views. At the outer circumference are seen the ribs 12, 13 and 15, and in the center a seating orifice 16, preferably set upright inwardly, to facilitate assembly of the composite panel 1 to a vehicle via introduction of bolts, screws or similar connecting apparatus through the orifice 16 of the clamping device. The clamping device may be employed to fasten the composite panels 1 of the invention to the structural parts of a vehicle (e.g., auto or truck). The panel 1 may be fastened to the floor 14 of a vehicle or another surface by means of a screw, bolt or other tensioning fastener extending through aperture 16 and into said vehicle floor 14 or other surface.

The composite material of the present invention is particularly useful as a heat shield in the floor of motor vehicles to protect against heat generated by the catalytic converter.

Composite panels 1 with a flexible core 4 and fastening elements according to the present invention may easily be installed by robots.

While particular embodiments of the invention have been described, it will be understood, of course, that the invention is not limited thereto since many obvious modifications can be made, and it is intended to include within this invention any such modifications as will fall within the scope of the invention as defined by the appended claims.

What is claimed is:

1. A composite material comprising
   an aluminum foil sheet having a thickness between 0.05 and 0.25 mm,
   a fiberglass mat having a thickness of between 3 and 10 mm joined to one side of said foil by a bonding agent, and
   an aluminum sheet having a thickness of between 0.4 and 0.8 mm joined to the other side of said glass mat by said bonding agent,
   said bonding agent comprising a heat sealing lacquer comprising an ionomer resin layer having a weight of between 3 and 13 grams per square meter and
   said composite material being flexible and deformable.

2. The composite material of claim 1 wherein the aluminum foil sheet is 0.15 mm thick and the aluminum sheet is 0.5 mm thick.

3. The composite material according to claim 1 wherein the aluminum foil consists of pure aluminum in the cold rolled state and the aluminum sheet consists of pure aluminum which has been cold rolled and annealed.

4. The composite material according to claim 1 wherein the glass fiber mat has a crude density of 90 to 180 kg/m$^3$.

5. The composite material according to claim 1 wherein the aluminum foil sheet is provided with stamped holow chambers.

6. The composite material according to claim 1 wherein the thickness ratio of aluminum foil sheet to glass fiber mat to aluminum sheet is substantially 1 : 30 : 3.5.

7. A composite material as recited in claim 1, wherein the composite material is deformable to a compressed state for shaping and is expandable to its original shape after such shaping.

8. The composite material of claim 1 wherein the ionomer resin comprises inorganic salt group attached to a polyethylene chain.

9. The composite material of claim 8 wherein said inorganic salt group is a sodium salt.

10. The composite material of claim 8 wherein said poly ethylene ionomer resin is a co-polymer of ethylene and methacrylic acid containing sodium ions.

11. The composite material according to claim 1, wherein the heat-sealing lacquer comprises a dried aqueous dispersion comprising a secondary dispersion that is ammoniacally saponified with anionic emulsifiers.

12. The composite material according to claim 11 wherein the dispersion has a solids content of 20 to 50% by weight, a viscosity of 100 to 1000 milli Pascal seconds at a pH of 9.8 to 10.5, and a particle size of 1 to 4 microns.

13. The composite material of claim 12 wherein said glass fibers are between 8 and 11 microns in diameter.

* * * * *